E. H. SMITH.
SEWING MACHINE.
No. 18,605.  Patented Nov. 10, 1857.
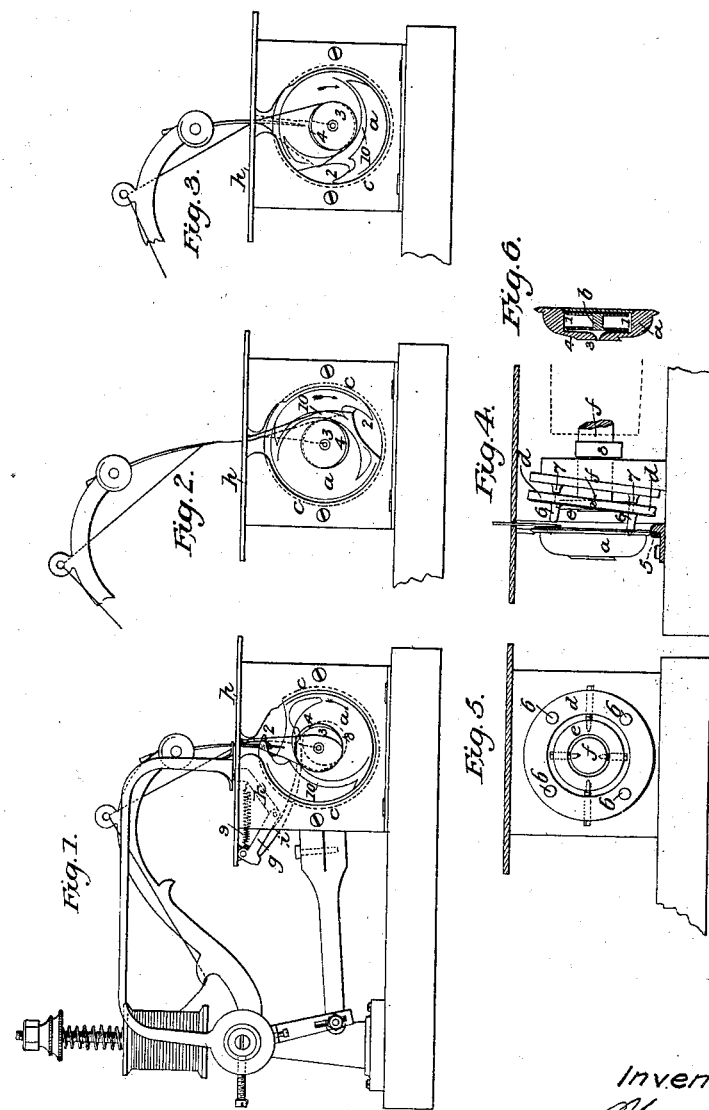

UNITED STATES PATENT OFFICE.

E. HARRY SMITH, OF NEW YORK, N. Y.

IMPROVEMENT IN SEWING-MACHINES.

Specification forming part of Letters Patent No. 18,605, dated November 10, 1857.

*To all whom it may concern:*

Be it known that I, E. HARRY SMITH, of the State, city, and county of New York, have invented certain new and useful Improvements in Sewing-Machines; and I declare the following to be a full, clear, and exact description of the same, reference being had to the accompanying drawings, which form a part of this specification, in which—

Figure 1 is a side elevation of the whole, showing the needle-arm, fixed arm, shuttle, and the feeding apparatus, the latter in dotted lines. Figs. 2 and 3 show the shuttle in different positions. Fig. 4 represents the shuttle and its bearings in section. Fig. 5 represents the self-accommodating ring or disk with the projections on its face, which give motion to the shuttle. Fig. 6 shows the shuttle in section and the bobbin in its interior.

The nature of my invention consists in a new construction of what is known as the "discoidal shuttle" of sewing-machines. Its peculiarity consists in the method of controlling the loop of needle-thread (through which it is made to pass a bobbin which it carries) by means of a button-like projection or raised disk on its face.

To enable others to make and use my invention, I will proceed to describe its construction and operation.

The shuttle is constructed of metal or other material, and is circular in form. A small cavity, 1, is formed on one side of the center, similar to that described in my patent of April 18, A. D. 1855, or larger in proportion to the size of the shuttle. Into this cavity a bobbin, *b*, is inserted, or a cap. On the same side of the shuttle *a*, opposite the bobbin-cavity, the shuttle is chamfered off and a small nose or hook, 2, formed in its edge to catch the loop from the needle. The center of the shuttle *a* is slightly raised, so as to form a small disk or button, 3, which receives the loop of thread from the body of the shuttle after the bobbin *b* has passed through, and retains it until the rotation of the shuttle releases it at the proper time, which is done by having one side cut away, as shown at 4. The sectional view of Fig. 6 shows the transverse form of this disk-button. The thread of the shuttle is delivered at its center of rotation. The shuttle has its bearings in a concentric ring formed of two parts. (Seen in section at Fig. 4.) In one or both of these parts an annular depression may be formed, 5, immediately surrounding the bearings of the shuttle, for the reception of a small quantity of oil. The shuttle is caused to rotate in its bearings by means o, a disk, *d*, or its mechanical equivalent, which is furnished with pins or projections 6 on its face, which mesh into corresponding holes in the back of the shuttle. The disk *d*, which carries the pins, is so attached to the driving-shaft *f* by a universal-joint mechanism, *e*, that it constantly accommodates itself to the fixed bearings 7 behind it, and thus always bears an angular relation to the plane of the shuttle's rotation, Fig. 4. It necessarily follows, therefore, that one or more of these projections 6 are only acting on the shuttle at once, the others being removed more or less on account of the angular or eccentric position of the disk to which they are attached. By thus positioning the driving-disk *d* a space is left at the top of the shuttle, between it and the driving-disk, for the needle and its thread to pass freely.

The construction of the feeding mechanism is as follows: *g* is a lever pivoted at one end to the platform *h*, or some fixed part of the frame. It has an arm, *i*, which extends to a cam, 8, on the driving-shaft and receives an up-and-down motion. This gives motion to the short lever *k*, (see dotted lines, Fig. 4,) which has a few teeth formed on its upper end, and by the upward movement imparted to it it is caused to act on the cloth to carry it forward. The small spiral spring 9 holds the teeth to the surface of the cloth, and produces the return movement of the feed-bar when it is released by the cam.

The operation will now be explained. When the several parts are in the position shown in Fig. 1, the nose of the shuttle is about to enter the bow of thread forming on the needle. As the shuttle rotates in the direction of the arrow, the loop is extended, and the front part of it, or that which passes over the face of the shuttle, is momentarily arrested by the chamfer at 10, Fig. 2, until the needle again reaches the cloth, (it having in the meantime performed the upward stroke,) and this chamfer 10 takes up the slack above the cloth as the needle begins to descend. When the needle's eye passes the cloth, as shown in Fig. 3, the front part of the loop slips off the chamfer and is drawn against the edge of the small button 3 on the center of the shuttle. The rotation continuing, the button 3 finally receives the entire loop from the body of the shuttle, and the parts begin to assume the position shown in Fig. 1. The loop held by the button now slips off as the nose of the shuttle enters the little bow on the needle, and the movements are again repeated, as before.

The operation of the feeding mechanism will be understood from the previous description.

I do not claim a shuttle upon which the loop of needle-thread is drawn at every stitch, as shown in the patent of Joseph Bond, Jr., of May, 1855.

I claim as my invention and desire to secure by Letters Patent—

The discoidal shuttle, constructed as set forth, and made to control the loop of needle-thread substantially in the manner described and represented.

E. HARRY SMITH.

Witnesses:
LEMUEL W. SERRELL,
THOMAS G. HAROLD.